(12) United States Patent
Yang

(10) Patent No.: US 9,255,629 B2
(45) Date of Patent: *Feb. 9, 2016

(54) TRANSMISSION WHEEL SERIES WITH PERIODICALLY VARIED SPEED RATIO AND HAVING RECIPROCALLY DISPLACING AUXILIARY PULLEY FOR STORING/RELEASING KINETIC ENERGY

(71) Applicant: Tai-Her Yang, Dzan-Hwa (TW)

(72) Inventor: Tai-Her Yang, Dzan-Hwa (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/108,434

(22) Filed: Dec. 17, 2013

(65) Prior Publication Data

US 2014/0171241 A1 Jun. 19, 2014

Related U.S. Application Data

(63) Continuation-in-part of application No. 13/717,995, filed on Dec. 18, 2012.

(51) Int. Cl.
| | |
|---|---|
| *F16H 55/30* | (2006.01) |
| *F16H 55/36* | (2006.01) |
| *F16H 9/04* | (2006.01) |
| *B62M 1/10* | (2010.01) |
| *B62M 9/08* | (2006.01) |
| *B62M 9/00* | (2006.01) |

(52) U.S. Cl.
CPC ............... *F16H 9/04* (2013.01); *B62M 1/105* (2013.01); *B62M 9/08* (2013.01); *B62M 9/085* (2013.01); *B62M 2009/002* (2013.01)

(58) Field of Classification Search
CPC ...... F16H 9/04; F16H 35/02; F16H 2035/003; F16H 7/08; B62M 9/08; B62M 9/085; B62M 2009/002

USPC .............................................. 474/69, 71, 141
See application file for complete search history.

(56) References Cited

U.S. PATENT DOCUMENTS

| | | | | | |
|---|---|---|---|---|---|
| 528,145 | A | * | 10/1894 | Carr ................................. | 474/84 |
| 528,956 | A | * | 11/1894 | Lippy ........................... | 280/238 |
| 529,267 | A | * | 11/1894 | Homan ......................... | 474/141 |
| 591,488 | A | * | 10/1897 | McMullin ...................... | 474/81 |
| 596,289 | A | * | 12/1897 | Smith ........................... | 474/141 |
| 599,211 | A | * | 2/1898 | Williams ....................... | 474/141 |
| 611,170 | A | * | 9/1898 | Howard ........................ | 474/134 |
| 613,756 | A | * | 11/1898 | Buddle ......................... | 474/141 |
| 618,094 | A | * | 1/1899 | Hess ............................... | 74/413 |
| 885,982 | A | * | 4/1908 | Delacroix ..................... | 474/136 |
| 2,155,108 | A | * | 4/1939 | Ware ................................ | 74/25 |
| 2,277,458 | A | * | 3/1942 | Schultze ....................... | 474/134 |
| 2,876,616 | A | * | 3/1959 | Austin, Jr. et al. ................ | 57/91 |

(Continued)

*Primary Examiner* — Henry Liu
(74) *Attorney, Agent, or Firm* — Bacon & Thomas, PLLC

(57) ABSTRACT

The present invention is installed with a unidirectional transmission device at the active side, so when a transmission belt is tightened while the active pulley driving a passive pulley in periodically varied speed ratios, an auxiliary pulley (312) is linked simultaneously so as to form a prestressed force for storing energy, when the force applied by the active pulley to the passive pulley through the transmission belt is zero or relatively smaller, the auxiliary pulley (312) is enabled to release energy for recovering so as to apply force to the transmission belt, because the transmission belt is coupled to the active pulley and/or one end of the active wheel shaft combined with the active pulley is restrained by the unidirectional transmission device, the transmission belt is enabled to link the passive pulley to operate in the original revolving direction for feeding back the kinetic energy.

22 Claims, 7 Drawing Sheets

(56) References Cited

U.S. PATENT DOCUMENTS

| | | | | |
|---|---|---|---|---|
| 2,994,216 | A * | 8/1961 | Morton | 68/140 |
| 3,259,398 | A * | 7/1966 | Hattan | 280/236 |
| 3,375,022 | A * | 3/1968 | Hattan | 280/238 |
| 3,396,988 | A * | 8/1968 | Kroening | 280/93.502 |
| 3,648,542 | A * | 3/1972 | Perotti et al. | 74/594.1 |
| 3,819,002 | A * | 6/1974 | Heathwaite et al. | 180/227 |
| 3,831,978 | A * | 8/1974 | Dunder et al. | 280/238 |
| 3,870,134 | A * | 3/1975 | Anthamatten | 192/217.5 |
| 3,873,128 | A * | 3/1975 | Dunder et al. | 280/236 |
| 3,899,932 | A * | 8/1975 | Durham | 474/141 |
| 3,972,244 | A * | 8/1976 | Bieser et al. | 474/17 |
| 4,103,563 | A * | 8/1978 | Genzling | 74/594.5 |
| 4,159,652 | A * | 7/1979 | Trammell, Jr. | 74/117 |
| 4,173,154 | A * | 11/1979 | Sawmiller et al. | 474/88 |
| 4,181,034 | A * | 1/1980 | Daniel | 474/141 |
| 4,193,324 | A * | 3/1980 | Marc | 475/349 |
| 4,218,931 | A * | 8/1980 | Tritenne | 474/165 |
| 4,501,576 | A * | 2/1985 | Tanaka et al. | 474/141 |
| 4,522,610 | A * | 6/1985 | Nagano | 474/141 |
| 4,816,009 | A * | 3/1989 | Philipp | 474/69 |
| 4,850,939 | A * | 7/1989 | Chilcote et al. | 474/49 |
| 4,865,577 | A * | 9/1989 | Freudenstein | 474/141 |
| 4,976,348 | A * | 12/1990 | Berry | 192/217.4 |
| 5,067,370 | A * | 11/1991 | Lemmens | 74/594.2 |
| 5,078,026 | A * | 1/1992 | Giffin | 74/594.4 |
| 5,611,556 | A * | 3/1997 | Davidow | 280/236 |
| 5,882,025 | A * | 3/1999 | Runnels | 280/259 |
| 5,899,477 | A * | 5/1999 | Vergara | 280/261 |
| 6,293,884 | B1 * | 9/2001 | Chattin | 474/160 |
| 6,371,874 | B1 * | 4/2002 | Inoue | 474/156 |
| 6,840,136 | B1 * | 1/2005 | Jones | 74/594.2 |
| 7,128,672 | B2 * | 10/2006 | Chattin | 474/141 |
| 2007/0173361 | A1 * | 7/2007 | Schuseil | 474/87 |
| 2007/0246908 | A1 * | 10/2007 | Shu | 280/261 |
| 2008/0083595 | A1 * | 4/2008 | Spiegel et al. | 192/43.1 |
| 2009/0036244 | A1 * | 2/2009 | Gravio | 474/156 |
| 2012/0252622 | A1 * | 10/2012 | Yang | 475/167 |
| 2013/0130851 | A1 * | 5/2013 | Yang | 474/71 |
| 2014/0135157 | A1 * | 5/2014 | Yang | 474/71 |
| 2014/0135159 | A1 * | 5/2014 | Yang | 474/148 |

* cited by examiner

TRANSMISSION WHEEL SERIES WITH PERIODICALLY VARIED SPEED RATIO AND HAVING RECIPROCALLY DISPLACING AUXILIARY PULLEY FOR STORING/RELEASING KINETIC ENERGY

CROSS REFERENCE TO RELATED APPLICATION

This is a Continuation-In-Part of application Ser. No. 13/717,995, filed on Dec. 18, 2012.

BACKGROUND OF THE INVENTION (a) Field of the Invention

The present invention is to utilize an active pulley driven by a power source having unidirectional rotating output feature, or to install a unidirectional transmission device installed between the active pulley and a machine body or between an active wheel shaft combined with the active pulley and the machine body, so when a transmission belt is tightened while the active pulley driving a passive pulley in periodically varied speed ratios, meanwhile an auxiliary pulley (312) of an auxiliary pulley assembly for storing/releasing kinetic energy (700) is linked for storing energy to form a prestressed force, when the force applied by the active pulley to the passive pulley through the transmission belt is zero or relatively smaller, the auxiliary pulley (312) is enabled to release energy for recovering so as to apply force to the transmission belt, because the transmission belt is coupled to the active pulley and/or one end of the active wheel shaft combined with the active pulley is restrained by the unidirectional transmission device, the transmission belt is enabled to link the passive pulley to operate in the original revolving direction for feeding back the kinetic energy.

(b) Description of the Prior Art

A conventional transmission pulley set composed of an active chain wheel, a passive chain wheel and a transmission chain, or a transmission pulley set composed of an active tooth-shaped wheel, a passive tooth-shaped wheel, a tooth-shaped transmission belt or a tooth-shaped transmission chain both have features as followings: 1) a non-sliding synchronous transmission feature is formed between the active chain wheel and the passive chain wheel and the transmission chain, or between the active tooth-shaped wheel and the passive tooth-shaped wheel and the tooth-shaped transmission belt or the tooth-shaped transmission chain; (2) if the length of the transmission chain or the tooth-shaped transmission belt or the tooth-shaped transmission chain is changed during the operation or during switching the speed ratio, a prestressed auxiliary idle wheel is often installed for randomly adjusting the tightness of the transmission chain, the tooth-shaped transmission belt or the tooth-shaped transmission chain, however, the tightness of transmission chain would be periodically varied during the operation, so the prestressed mechanism of the auxiliary idle wheel for storing/releasing kinetic energy is reciprocally displaced for storing energy and releasing energy, wherein one disadvantage of the prior art is that the increased load generated at the active side while the transmission chain pressing the auxiliary idle wheel cannot be fed back as a kinetic driving energy.

SUMMARY OF THE INVENTION

The present invention discloses a driving device composed of an active pulley, a transmission belt and a passive pulley; the transmission wheel series is characterized in: (1) when the active pulley and the passive pulley are both formed as a noncircular synchronous transmission pulley, or (2) when one or both of the active pulley and the passive pulley are formed as a circular pulley and the other is formed as a noncircular synchronous transmission pulley, during each revolving period, the tightness of the transmission belt installed between the active pulley and the passive pulley is varied periodically, wherein the active pulley driven by a power source having unidirectional rotating output feature, or a unidirectional transmission device installed between the active pulley and a machine body or between an active wheel shaft combined with the active pulley and the machine body, when the transmission belt is tightened while the active pulley driving the passive pulley in periodically varied speed ratios, meanwhile an auxiliary pulley of an auxiliary pulley assembly for storing/releasing kinetic energy is linked for storing energy to from a prestressed force, when the force applied by the active pulley to the passive pulley through the transmission belt is zero or relatively smaller, the auxiliary pulley is enabled to release energy for recovering so as to apply force to the transmission belt, because the end of the transmission belt coupled to the active pulley is restrained by the unidirectional transmission device, the transmission belt is enabled to link the passive pulley to operate in the original revolving direction for feeding back the kinetic energy.

DESCRIPTION OF MAIN COMPONENT SYMBOLS

Figure 1:
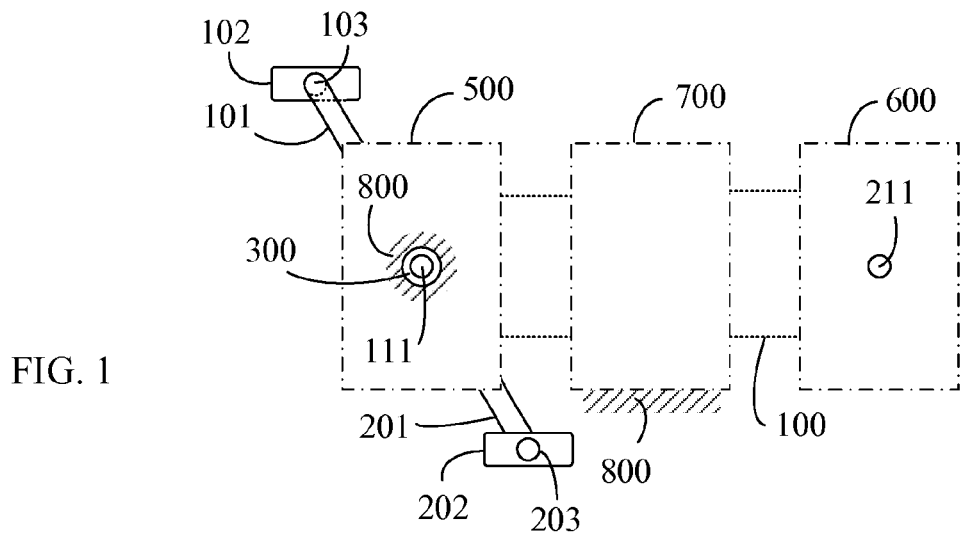
FIG. 1 is a schematic structural view of the present invention illustrating a unidirectional rotating transmission device (300) being installed between an active wheel shaft (111) and a machine body (800) for linking a passive pulley through a transmission belt (100) so as to drive the passive pulley in the original rotating direction while an auxiliary pulley (312) releasing energy for recovering.

100: Transmission belt
101: First crank
102: First treadle
103: First treadle shaft
111: Active wheel shaft
112: Bimodal elliptical active pulley
113: Circular active pulley
201: Second crank
202: Second treadle
203: Second treadle shaft
211: Passive wheel shaft
212: Circular passive pulley
213: Bimodal elliptical passive pulley
300: Unidirectional rotating transmission device
301: Auxiliary wheel press helve
302: Prestressed energy storing/releasing spring
303: Swing shaft of auxiliary wheel press helve
311: Auxiliary wheel shaft
312: Auxiliary pulley
4021: Bidirectional inward-towards-outward-expanding prestressed spring for storing/releasing energy
4022: Bidirectional outward-towards-inward-retracting prestressed spring for storing/releasing energy
413: Circular eccentric passive pulley
500: Active pulley assembly
600: Passive pulley assembly
700: Auxiliary pulley assembly for storing/releasing kinetic energy
800: Machine body

DETAILED DESCRIPTION OF THE PREFERRED EMBODIMENTS

A conventional transmission pulley set composed of an active chain wheel, a passive chain wheel and a transmission chain, or a transmission pulley set composed of an active tooth-shaped wheel, a passive tooth-shaped wheel, a tooth-shaped transmission belt or a tooth-shaped transmission chain both have features as followings: 1) a non-sliding synchronous transmission feature is formed between the active chain wheel and the passive chain wheel and the transmission chain, or between the active tooth-shaped wheel and the passive tooth-shaped wheel and the tooth-shaped transmission belt or the tooth-shaped transmission chain; (2) if the length of the transmission chain or the tooth-shaped transmission belt or the tooth-shaped transmission chain is changed during the operation or during switching the speed ratio, a prestressed auxiliary idle wheel is often installed for randomly adjusting the tightness of the transmission chain, the tooth-shaped transmission belt or the tooth-shaped transmission chain, however, the tightness of transmission chain would be periodically varied during the operation, so the prestressed mechanism of the auxiliary idle wheel for storing/releasing kinetic energy is reciprocally displaced for storing energy and releasing energy, wherein one disadvantage of the prior art is that the increased load generated at the active side while the transmission chain pressing the auxiliary idle wheel cannot be fed back as a kinetic driving energy;

The present invention is to utilize an active pulley driven by a power source having unidirectional rotating output feature, or to install a unidirectional transmission device installed between the active pulley and a machine body or between an active wheel shaft combined with the active pulley and the machine body, so when a transmission belt is tightened while the active pulley driving a passive pulley in periodically varied speed ratios, meanwhile an auxiliary pulley (312) of an auxiliary pulley assembly for storing/releasing kinetic energy (700) is linked for storing energy to form a prestressed force, when the force applied by the active pulley to the passive pulley through the transmission belt is zero or relatively smaller, the auxiliary pulley (312) is enabled to release energy for recovering so as to apply force to the transmission belt, because the transmission belt is coupled to the active pulley and/or one end of the active wheel shaft combined with the active pulley is restrained by the unidirectional transmission device, the transmission belt is enabled to link the passive pulley to operate in the original revolving direction for feeding back the kinetic energy;

The present invention discloses a driving device composed of an active pulley, a transmission belt and a passive pulley; the transmission wheel series is characterized in: (1) when the active pulley and the passive pulley are both formed as a noncircular synchronous transmission pulley, or (2) when one or both of the active pulley and the passive pulley are formed as a circular pulley and the other is formed as a noncircular synchronous transmission pulley, during each revolving period, the tightness of the transmission belt installed between the active pulley and the passive pulley is varied periodically, wherein the active pulley driven by a power source having unidirectional rotating output feature, or a unidirectional transmission device installed between the active pulley and a machine body or between an active wheel shaft combined with the active pulley and the machine body, when the transmission belt is tightened while the active pulley driving the passive pulley in periodically varied speed ratios, meanwhile an auxiliary pulley of an auxiliary pulley assembly for storing/releasing kinetic energy is linked for storing energy to from a prestressed force, when the force applied by the active pulley to the passive pulley through the transmission belt is zero or relatively smaller, the auxiliary pulley is enabled to release energy for recovering so as to apply force to the transmission belt, because the end of the transmission belt coupled to the active pulley is restrained by the unidirectional transmission device, the transmission belt is enabled to link the passive pulley to operate in the original revolving direction for feeding back the kinetic energy;

Several embodiments for illustrating the transmission wheel series with periodically varied speed ratio and having reciprocally displacing auxiliary pulley for storing/releasing kinetic energy provided by the present invention are as followings:

FIG. 1 is a schematic structural view of the present invention illustrating a unidirectional rotating transmission device (300) being installed between an active wheel shaft (111) and a machine body (800) for linking a passive pulley through a transmission belt (100) so as to drive the passive pulley in the original rotating direction while an auxiliary pulley (312) releasing energy for recovering;

As shown in FIG. 1, mainly consists of:

The transmission wheel series with periodically varied speed ratio and having reciprocally displacing auxiliary pulley for storing/releasing kinetic energy is provided with a non-releasing synchronous transmission relation between the transmission belt and the transmission wheel thereby forming a non-sliding synchronous transmission wheel set, the mentioned wheel set can be composed of a chain-shaped transmission belt and a chain wheel, or a tooth-shaped pulley and a tooth-shaped transmission belt; wherein:

active pulley assembly (500): composed of an active wheel shaft (111), an active pulley and a unidirectional rotating transmission device (300), the active pulley is combined with the active wheel shaft (111), the active wheel shaft (111) is served to input the rotational kinetic energy, the unidirectional rotating transmission device (300) is installed between the active wheel shaft (111) and the machine body, the active pulley is composed of various transmission pulleys having different transmission radius and dimensions and formed in circular, or bimodal elliptical, or eccentric circular, or eccentric elliptical or eccentric bimodal elliptical shapes;

passive pulley assembly (600): composed of a passive wheel shaft (211) and a passive pulley, the passive pulley is served to revolve on the passive wheel shaft (211), the passive pulley is composed of various transmission pulleys having different transmission radius and dimensions and formed in circular, or bimodal elliptical, or eccentric circular, or eccentric elliptical or eccentric bimodal elliptical shapes;

transmission belt (100): composed of a chain or a tooth-shaped transmission belt, a non-releasing synchronous transmission relation is formed between the transmission belt and the transmission wheel, thereby structuring a non-sliding synchronous transmission wheel set, the mentioned wheel set includes being composed of a chain-shaped transmission belt and a chain wheel, or a tooth-shaped pulley and a tooth-shaped transmission belt;

auxiliary pulley assembly for storing/releasing kinetic energy (700): installed with an auxiliary pulley (312), the mentioned auxiliary pulley (312) served for bearing the prestressing force applied by a prestressing device is disposed at the portion of the transmission belt (100) defined between the location where the passive pulley and the transmission belt (100) being ready to be synchronously combined and the location where the active pulley being released from the transmission belt (100); when the active pulley of the active pulley assembly (500) periodically drives the passive pulley of the passive pulley assembly (600), the tightness of the transmission belt (100) is varied correspondingly, when the transmission belt (100) is gradually tightened, an auxiliary wheel press helve (301) having plate-shaped spring function and/or the auxiliary pulley (312) having a prestressed energy storing/releasing spring (302) and installed between the rigid press helve and the machine body (800) is displaced for storing energy, when the transmission belt (100) is gradually loosened, with the energy releasing displacement by the auxiliary wheel press helve (301) having plate-shaped spring function and/or the prestressed energy storing/releasing spring (302), and with the rotating direction restrain provided by the unidirectional rotating transmission device (300), the transmission belt (100) is enabled to pull the active pulley and the passive pulley to be linked in the original rotating direction so as to perform energy releasing drive; and with the disclosed structure, the speed ratio of driving the passive pulley is varied periodically.

The transmission wheel series with periodically varied speed ratio and having reciprocally displacing auxiliary pulley for storing/releasing kinetic energy of the present invention are applied extensively, and followings are several applications adopted in a treadle-drive bicycle or a fixed treadle-drive bicycle for exercising for further illustration.

Figure 2:
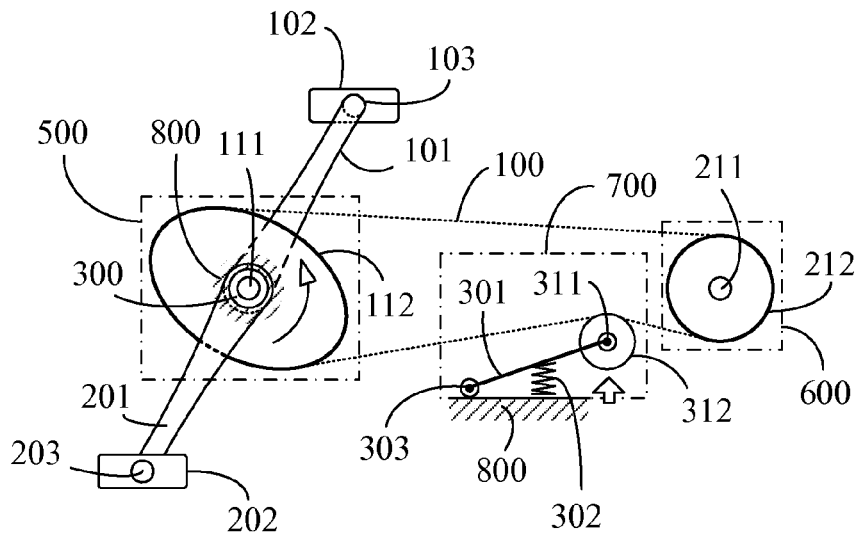
FIG. 2 is a schematic view illustrating the embodiment of the present invention in which an elliptical pulley installed with the unidirectional rotating transmission device (300) between the wheel shaft and the machine body being adopted as the active pulley and a circular pulley being adopted as the passive pulley, and a transmission belt and an auxiliary pulley being installed.

FIG. 2 is a schematic view illustrating the embodiment of the present invention in which an elliptical pulley installed with the unidirectional rotating transmission device (300) between the wheel shaft and the machine body being adopted as the active pulley and a circular pulley being adopted as the passive pulley, and a transmission belt and an auxiliary pulley being installed;

As shown in FIG. 2, mainly consists of:
bimodal elliptical active pulley (112): composed of a bimodal elliptical active pulley (112) (or a bimodal elliptical-like active pulley), installed with the active wheel shaft (111), the unidirectional rotating transmission device (300) is installed between the active wheel shaft (111) and the machine body (800), one side of the active wheel shaft (111) of the bimodal elliptical active pulley (112) is driven by a first crank (101) linked by a first treadle (102) revolving on a first treadle shaft (103) for performing the revolving driving, the other side of the active wheel shaft (111) is driven by a second crank (201) linked by a second treadle (202) revolving on a second treadle shaft (203) for performing the revolving driving, thereby linking a circular passive pulley (212) having a passive wheel shaft (211) through the transmission belt (100);
circular passive pulley (212): composed of a circular passive pulley (212) (or a circular-like passive pulley), served to be linked by the transmission belt (100) driven by the bimodal elliptical active pulley (112);
transmission belt (100): composed of a chain or a tooth-shaped transmission belt, a non-releasing synchronous transmission relation is formed between the transmission belt and the transmission wheel, thereby structuring a non-sliding synchronous transmission wheel set, the mentioned wheel set includes being composed of a chain-shaped transmission belt and a chain wheel, or a tooth-shaped pulley and a tooth-shaped transmission belt;
auxiliary pulley assembly for storing/releasing kinetic energy (700): installed with an auxiliary pulley (312), the mentioned auxiliary pulley (312) served for bearing the prestressing force applied by a prestressing device is disposed at the portion of the transmission belt (100) defined between the location where the circular passive pulley (212) and the transmission belt (100) being ready to be synchronously combined and the location where the bimodal elliptical active pulley (112) being released from the transmission belt (100); when the bimodal elliptical active pulley (112) periodically drives the circular passive pulley (212), the tightness of the transmission belt (100) is varied correspondingly, when the transmission belt (100) is gradually tightened, an auxiliary wheel press helve (301) having plate-shaped spring function and/or the auxiliary pulley (312) having a prestressed energy storing/releasing spring (302) and installed between the rigid press helve and the machine body (800) is displaced for storing energy, when the transmission belt (100) is gradually loosened, with the energy releasing displacement by the auxiliary wheel press helve (301) having plate-shaped spring function and/or the prestressed energy storing/releasing spring (302), and with the rotating direction restrain provided by the unidirectional rotating transmission device (300), the transmission belt (100) is enabled to pull the bimodal elliptical active pulley (112) to be linked in the original rotating direction so as to perform energy releasing drive;

With the disclosed structure, when the first treadle (102) and the second treadle (202) are stepped for driving, the speed ratio between the bimodal elliptical active pulley (112) and the circular passive pulley (212) is varied periodically during each period of the stepping.

Figure 3:
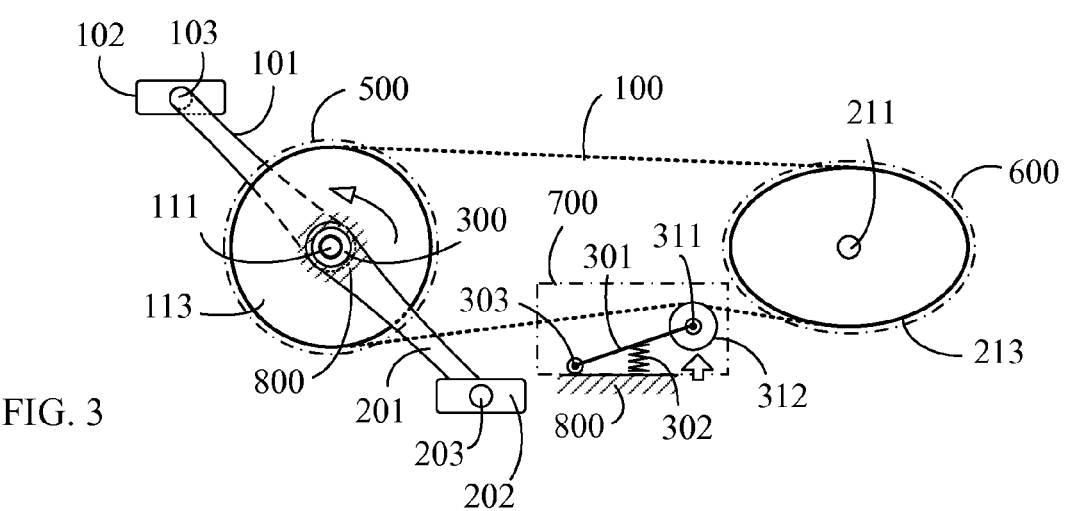
FIG. 3 is a schematic view illustrating the embodiment of the present invention in which a circular pulley installed with the unidirectional rotating transmission device (300) between the wheel shaft and the machine body being adopted as the active pulley and an elliptical pulley being adopted as the passive pulley, and a transmission belt and an auxiliary pulley being installed.

FIG. 3 is a schematic view illustrating the embodiment of the present invention in which a circular pulley installed with the unidirectional rotating transmission device (300) between the wheel shaft and the machine body being adopted as the active pulley and an elliptical pulley being adopted as the passive pulley, and a transmission belt and an auxiliary pulley being installed;

As shown in FIG. 3, mainly consists of:
circular active pulley (113): composed of a circular active pulley (113) (or a circular-like active pulley), installed with the active wheel shaft (111), the unidirectional rotating transmission device (300) is installed between the active wheel shaft (111) and the machine body (800), one side of the active wheel shaft (111) of the circular active pulley (113) is driven by a first crank (101) linked by a first treadle (102) revolving on a first treadle shaft (103) for performing the revolving driving, the other side of the active wheel shaft (111) is driven by a second crank (201) linked by a second treadle (202) revolving on a second treadle shaft (203) for performing the revolving driving, thereby linking a bimodal elliptical passive pulley (213) having a passive wheel shaft (211) through the transmission belt (100);
bimodal elliptical passive pulley (213): composed of a bimodal elliptical passive pulley (213) (or a bimodal elliptical-like passive pulley), linked by the transmission belt (100) driven by the circular active pulley (113);
transmission belt (100): composed of a chain or a tooth-shaped transmission belt, a non-releasing synchronous transmission relation is formed between the transmission belt and the transmission wheel, thereby structuring a non-sliding synchronous transmission wheel set, the mentioned wheel set includes being composed of a chain-shaped transmission belt and a chain wheel, or a tooth-shaped pulley and a tooth-shaped transmission belt;
auxiliary pulley assembly for storing/releasing kinetic energy (700): installed with an auxiliary pulley (312), the mentioned auxiliary pulley (312) served for bearing the prestressing force applied by a prestressing device is disposed at the portion of the transmission belt (100) defined between the location where the bimodal elliptical passive pulley (213) and the transmission belt (100) being ready to be synchronously combined and the location where the circular active pulley (113) being released from the transmission belt (100); when the circular active pulley (113) periodically drives the bimodal elliptical passive pulley (213), the tightness of the transmission belt (100) is varied correspondingly, when the transmission belt (100) is gradually tightened, an auxiliary wheel press helve (301) having plate-shaped spring function and/or the auxiliary pulley (312) having a prestressed energy storing/releasing spring (302) and installed between the rigid press helve and the machine body (800) is displaced for storing energy, when the transmission belt (100) is gradually loosened, with the energy releasing displacement by the auxiliary wheel press helve (301) having plate-shaped spring function and/or the prestressed energy storing/releasing spring (302), and with the rotating direction restrain provided by the unidirectional rotating transmission device (300), the transmission belt (100) is enabled to pull the circular active pulley (113) and the bimodal elliptical passive pulley (213) to be linked in the original rotating direction so as to perform energy releasing drive;

With the disclosed structure, when the first treadle (102) and the second treadle (202) are stepped for driving, the speed ratio between the circular active pulley (113) and the bimodal elliptical passive pulley (213) is varied periodically during each period of the stepping.

Figure 4:
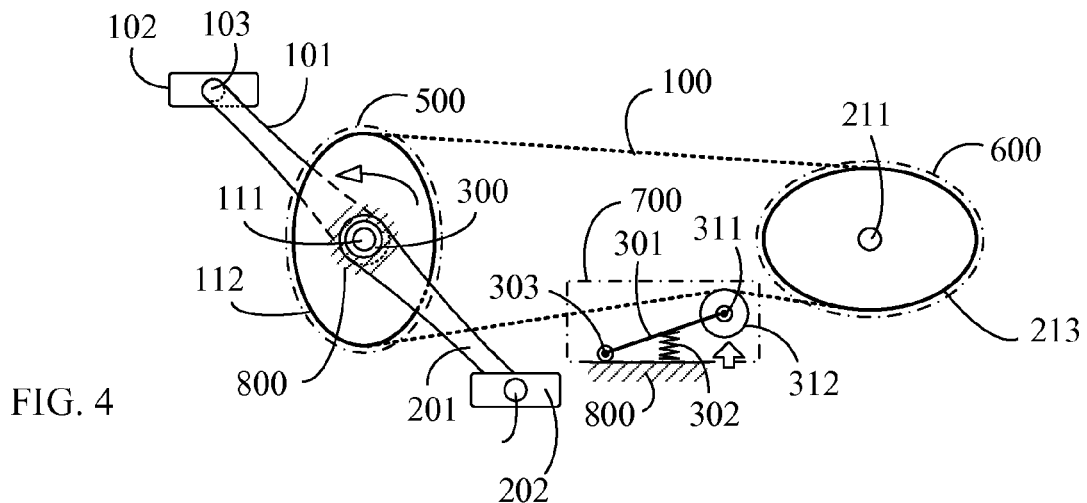
FIG. 4 is a schematic view illustrating the embodiment of the present invention in which the elliptical pulley installed with the unidirectional rotating transmission device (300) installed between the wheel shaft and the machine body being adopted as the active pulley and an elliptical pulley having 90 degree differentiation regarding to the active pulley being adopted as the passive pulley, and a transmission belt and an auxiliary pulley being installed.

FIG. 4 is a schematic view illustrating the embodiment of the present invention in which the elliptical pulley installed with the unidirectional rotating transmission device (300) installed between the wheel shaft and the machine body being adopted as the active pulley and an elliptical pulley having 90 degree differentiation regarding to the active pulley being adopted as the passive pulley, and a transmission belt and an auxiliary pulley being installed;

As shown in FIG. 4, mainly consists of:

bimodal elliptical active pulley (112): composed of a bimodal elliptical active pulley (112) (or a bimodal elliptical-like active pulley), installed with the active wheel shaft (111), the unidirectional rotating transmission device (300) is installed between the active wheel shaft (111) and the machine body (800), one side of the active wheel shaft (111) of the bimodal elliptical active pulley (112) is driven by a first crank (101) linked by a first treadle (102) revolving on a first treadle shaft (103) for performing the revolving driving, the other side of the active wheel shaft (111) is driven by a second crank (201) linked by a second treadle (202) revolving on a second treadle shaft (203) for performing the revolving driving, thereby linking a bimodal elliptical passive pulley (213) having a passive wheel shaft (211) through the transmission belt (100);

bimodal elliptical passive pulley (213): composed of a bimodal elliptical passive pulley (213) (or a bimodal elliptical-like passive pulley), linked by the transmission belt (100) driven by the circular active pulley (113);

transmission belt (100): composed of a chain or a tooth-shaped transmission belt, a non-releasing synchronous transmission relation is formed between the transmission belt and the transmission wheel, thereby structuring a non-sliding synchronous transmission wheel set, the mentioned wheel set includes being composed of a chain-shaped transmission belt and a chain wheel, or a tooth-shaped pulley and a tooth-shaped transmission belt;

auxiliary pulley assembly for storing/releasing kinetic energy (700): installed with an auxiliary pulley (312), the mentioned auxiliary pulley (312) served for bearing the prestressing force applied by a prestressing device is disposed at the portion of the transmission belt (100) defined between the location where the bimodal elliptical passive pulley (213) and the transmission belt (100) being ready to be synchronously combined and the location where the bimodal elliptical active pulley (112) being released from the transmission belt (100); when the bimodal elliptical active pulley (112) periodically drives the bimodal elliptical passive pulley (213), the tightness of the transmission belt (100) is varied correspondingly, when the transmission belt (100) is gradually tightened, an auxiliary wheel press helve (301) having plate-shaped spring function and/or the auxiliary pulley (312) having a prestressed energy storing/releasing spring (302) and installed between the rigid press helve and the machine body (800) is displaced for storing energy, when the transmission belt (100) is gradually loosened, with the energy releasing displacement by the auxiliary wheel press helve (301) having plate-shaped spring function and/or the prestressed energy storing/releasing spring (302), and with the rotating direction restrain provided by the unidirectional rotating transmission device (300), the transmission belt (100) is enabled to pull the bimodal elliptical active pulley (112) and the bimodal elliptical passive pulley (213) to be linked in the original rotating direction so as to perform energy releasing drive;

With the disclosed structure, when the first treadle (102) and the second treadle (202) are stepped for driving, the speed ratio between the bimodal elliptical active pulley (112) and the bimodal elliptical passive pulley (213) is varied periodically during each period of the stepping.

Figure 5:
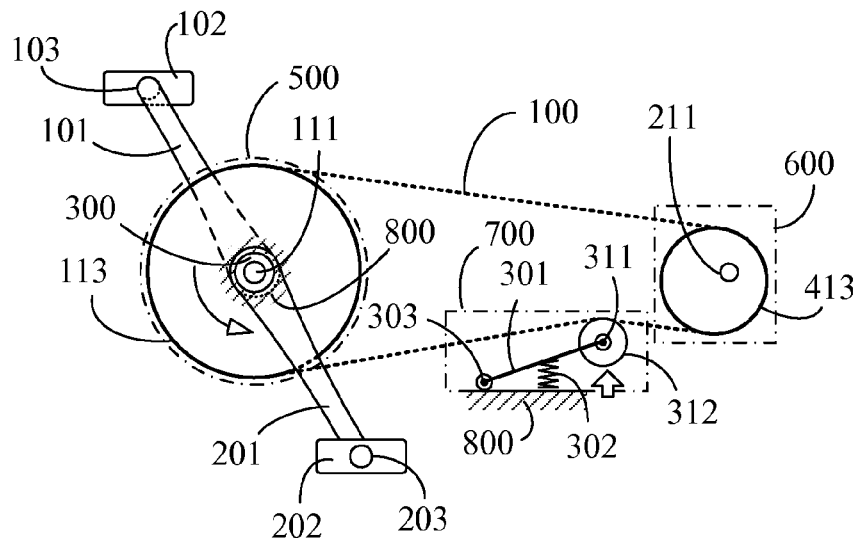
FIG. 5 is a schematic view illustrating the embodiment of the present invention in which the circular pulley installed with the unidirectional rotating transmission device (300) between the wheel shaft and the machine body being adopted as the active pulley and an eccentric circular pulley being adopted as the passive pulley, and a transmission belt and an auxiliary pulley being installed.

FIG. 5 is a schematic view illustrating the embodiment of the present invention in which the circular pulley installed with the unidirectional rotating transmission device (300) between the wheel shaft and the machine body being adopted as the active pulley and an eccentric circular pulley being adopted as the passive pulley, and a transmission belt and an auxiliary pulley being installed;

As shown in FIG. 5, mainly consists of:

circular active pulley (113): composed of a circular active pulley (113) (or a circular-like active pulley), installed with the active wheel shaft (111), the unidirectional rotating transmission device (300) is installed between the active wheel shaft (111) and the machine body (800), one side of the active wheel shaft (111) of the circular active pulley (113) is driven by a first crank (101) linked by a first treadle (102) revolving on a first treadle shaft (103) for performing the revolving driving, the other side of the active wheel shaft (111) is driven by a second crank (201) linked by a second treadle (202) revolving on a second treadle shaft (203) for performing the revolving driving, thereby linking an eccentric circular passive pulley (413) having a passive wheel shaft (211) through the transmission belt (100);

eccentric circular passive pulley (413): composed of an eccentric circular passive pulley (413) (or an eccentric circular-like passive pulley), linked by the transmission belt (100) driven by the circular active pulley (113);

transmission belt (100): composed of a chain or a tooth-shaped transmission belt, a non-releasing synchronous transmission relation is formed between the transmission belt and the transmission wheel, thereby structuring a non-sliding synchronous transmission wheel set, the mentioned wheel set includes being composed of a chain-shaped transmission belt and a chain wheel, or a tooth-shaped pulley and a tooth-shaped transmission belt;

auxiliary pulley assembly for storing/releasing kinetic energy (700): installed with an auxiliary pulley (312), the mentioned auxiliary pulley (312) served for bearing the prestressing force applied by a prestressing device is disposed at the portion of the transmission belt (100) defined between the location where the eccentric circular passive pulley (413) and the transmission belt (100)

being ready to be synchronously combined and the location where the circular active pulley (113) being released from the transmission belt (100); when the circular active pulley (113) periodically drives the eccentric circular passive pulley (413), the tightness of the transmission belt (100) is varied correspondingly, when the transmission belt (100) is gradually tightened, an auxiliary wheel press helve (301) having plate-shaped spring function and/or the auxiliary pulley (312) having a prestressed energy storing/releasing spring (302) and installed between the rigid press helve and the machine body (800) is displaced for storing energy, when the transmission belt (100) is gradually loosened, with the energy releasing displacement by the auxiliary wheel press helve (301) having plate-shaped spring function and/or the prestressed energy storing/releasing spring (302), and with the rotating direction restrain provided by the unidirectional rotating transmission device (300), the transmission belt (100) is enabled to pull the circular active pulley (113) and the eccentric circular passive pulley (413) to be linked in the original rotating direction so as to perform energy releasing drive;

With the disclosed structure, when the first treadle (102) and the second treadle (202) are stepped for driving, the speed ratio between the circular active pulley (113) and the eccentric circular passive pulley (413) is varied periodically during each period of the stepping.

Figure 6:
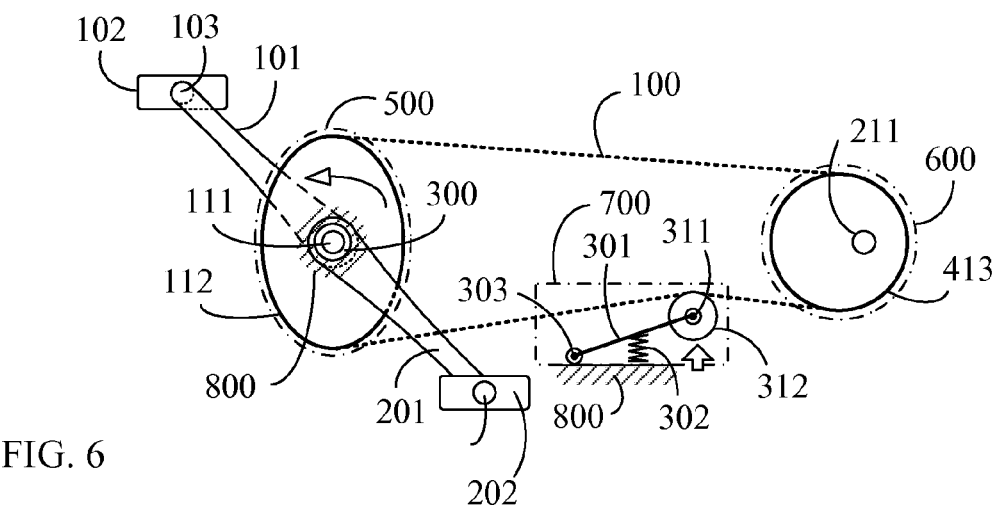
FIG. 6 is a schematic view illustrating the embodiment of the present invention in which the bimodal elliptical active pulley (112) installed with the unidirectional rotating transmission device (300) between the active wheel shaft (111) and the machine body (800) being adopted as the active pulley and an eccentric circular pulley being adopted as the passive pulley, and a transmission belt and an auxiliary pulley being installed.

According to the transmission wheel series with periodically varied speed ratio and having reciprocally displacing auxiliary pulley for storing/releasing kinetic energy, the structure of the auxiliary pulley assembly for storing/releasing kinetic energy (700) is illustrated as followings:

FIG. 6 is a schematic view illustrating the embodiment of the present invention in which the bimodal elliptical active pulley (112) installed with the unidirectional rotating transmission device (300) between the active wheel shaft (111) and the machine body (800) being adopted as the active pulley and an eccentric circular pulley being adopted as the passive pulley, and a transmission belt and an auxiliary pulley being installed.

As shown in FIG. 6, mainly consists of:

bimodal elliptical active pulley (112): composed of a bimodal elliptical active pulley (112) (or a bimodal elliptical-like active pulley) for being formed as the active pulley assembly (500), installed with the active wheel shaft (111), the unidirectional rotating transmission device (300) is installed between the active wheel shaft (111) and the machine body (800), one side of the active wheel shaft (111) of the bimodal elliptical active pulley (112) is driven by a first crank (101) linked by a first treadle (102) revolving on a first treadle shaft (103) for performing the revolving driving, the other side of the active wheel shaft (111) is driven by a second crank (201) linked by a second treadle (202) revolving on a second treadle shaft (203) for performing the revolving driving, thereby linking a bimodal elliptical passive pulley (213) having a passive wheel shaft (211) through the transmission belt (100); the phase angle of the periodically varied speed ratio of the bimodal elliptical active pulley (112) and the bimodal elliptical passive pulley (213) being combined with the transmission belt (100) is relevant to the phase angle of the first crank (101) and the first treadle (102) and the second crank (201) and the second treadle (202), and enabled to be selected when the bimodal elliptical active pulley (112) and the bimodal elliptical passive pulley (213) are combined with the transmission belt (100);

unidirectional rotating transmission device (300): composed of a structural member having the unidirectional rotating transmission function, such as a single way clutch, an over running clutch or a ratchet structure having the same function;

eccentric circular passive pulley (413): composed of an eccentric circular passive pulley (413) (or an eccentric circular-like passive pulley) for being formed as the passive pulley assembly (600), linked by the transmission belt (100) driven by the bimodal elliptical active pulley (112);

transmission belt (100): composed of a chain or a tooth-shaped transmission belt, a non-releasing synchronous transmission relation is formed between the transmission belt, the bimodal elliptical active pulley (112) and the eccentric circular passive pulley (413) thereby forming a non-sliding synchronous transmission wheel set, wherein the mechanical angle phase relation of the active pulley assembly (500) and the passive pulley assembly (600) relative to the transmission belt (100) is enabled to be selected with respect to the function; the mentioned wheel set includes being composed of a chain-shaped transmission belt and a chain wheel, or a tooth-shaped pulley and a tooth-shaped transmission belt;

auxiliary pulley assembly for storing/releasing kinetic energy (700): installed with an auxiliary pulley (312), the mentioned auxiliary pulley (312) served for bearing the prestressing force applied by a prestressing device is disposed at the portion of the transmission belt (100) defined between the location where the eccentric circular passive pulley (413) and the transmission belt (100) being ready to be synchronously combined and the location where the bimodal elliptical active pulley (112) being released from the transmission belt (100), the auxiliary pulley (312) is composed of a synchronizing transmission pulley or a non-synchronizing transmission pulley; when the bimodal elliptical active pulley (112) periodically drives the eccentric circular passive pulley (413), the tightness of the transmission belt (100) is varied correspondingly, when the transmission belt (100) is gradually tightened, with the auxiliary wheel press helve having plate-shaped spring function and/or a prestressed spring for prestressing, the auxiliary pulley (312) is displaced for storing energy; when being loosened, with the auxiliary wheel press helve having plate-shaped spring function and/or the prestressed spring for displacing and releasing energy, and with the rotating direction restrain provided by the unidirectional rotating transmission device (300), the transmission belt (100) is enabled to pull the bimodal elliptical active pulley (112) and the eccentric circular passive pulley (413) to be linked in the original rotating direction so as to perform energy releasing drive;

With the disclosed structure, when the first treadle (102) and the second treadle (202) are stepped for driving, the speed ratio between the bimodal elliptical active pulley (112) and the eccentric circular passive pulley (413) is varied periodically during each period of the stepping.

According to the transmission wheel series with periodically varied speed ratio and having reciprocally displacing auxiliary pulley for storing/releasing kinetic energy, the structure of the prestressing device of the auxiliary pulley assembly for storing/releasing energy (700) is illustrated by following examples:

(1) One end of the auxiliary wheel press helve (301) formed as a rigid and swingable support arm structure is swingably combined with the machine body (800), and an prestressed energy storing/releasing spring (302) is installed between the above two, the other end thereof is installed with an auxiliary wheel shaft (311) for being installed with the auxiliary pulley (312); or (2) One end of the auxiliary wheel press helve having plate-shaped spring function is combined with the machine body (800) for replacing the auxiliary wheel press helve (301) and the prestressed energy storing/releasing spring (302), the other end of the auxiliary wheel press helve having plate-shaped spring function is installed with the auxiliary wheel shaft (311), the auxiliary pulley (312) is enabled to receive the prestressing force applied by the auxiliary wheel press helve having plate-shaped spring function.

Figure 7:
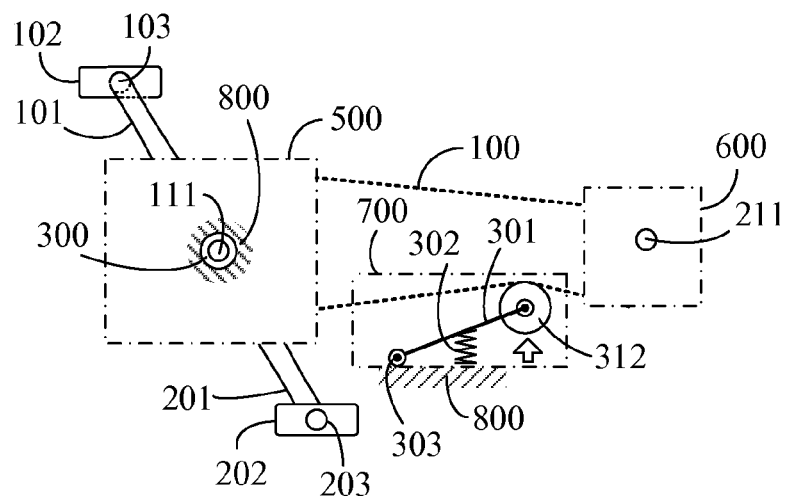
FIG. 7 is the first schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

FIG. 7 is the first schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

As shown in FIG. 7, the main configuration is that the rotation part of the active pulley assembly of the present invention is installed with the unidirectional rotating transmission device (300), the active side of the unidirectional rotating transmission device (300) is combined with the rotation part of the active pulley assembly (500), the passive side of the unidirectional rotating transmission device (300) is combined with the machine body (800), the distal end of the auxiliary wheel press helve (301) swingably installed on the machine body (800) is installed with a first auxiliary pulley (312), the releasing portion of the transmission belt (100) releasing from the passive pulley assembly (600) is installed with the auxiliary wheel press helve (301) capable of swinging along the machine body (800) to inwardly put prestressing force from the exterior in normal state, the prestressed energy storing/releasing spring (302) and the auxiliary pulley (312).

Figure 8:
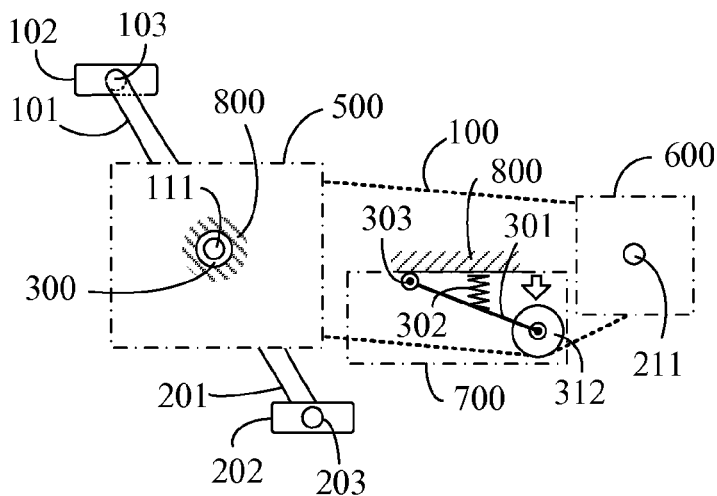
FIG. 8 is the second schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

FIG. 8 is the second schematic view illustrating the embodiment of the present invention in which a kinetic energy storing/releasing state being formed between the active pulley assembly (500), the passive pulley assembly (600) and the auxiliary pulley assembly for storing/releasing kinetic energy (700);

As shown in FIG. 8, the main configuration is that the rotation part of the active pulley assembly of the present invention is installed with the unidirectional rotating transmission device (300), the active side of the unidirectional rotating transmission device (300) is combined with the rotation part of the active pulley assembly (500), the passive side of the unidirectional rotating transmission device (300) is combined with the machine body (800), the distal end of the auxiliary wheel press helve (301) swingably installed on the machine body (800) is installed with a first auxiliary pulley (312), the engaging portion of the transmission belt (100) being ready to enter the passive pulley assembly (600) is installed with the auxiliary wheel press helve (301) capable of swinging along the machine body (800) to expand the prestressing force outwardly from the interior in normal state, the prestressed energy storing/releasing spring (302) and the auxiliary pulley (312).

Figure 9:
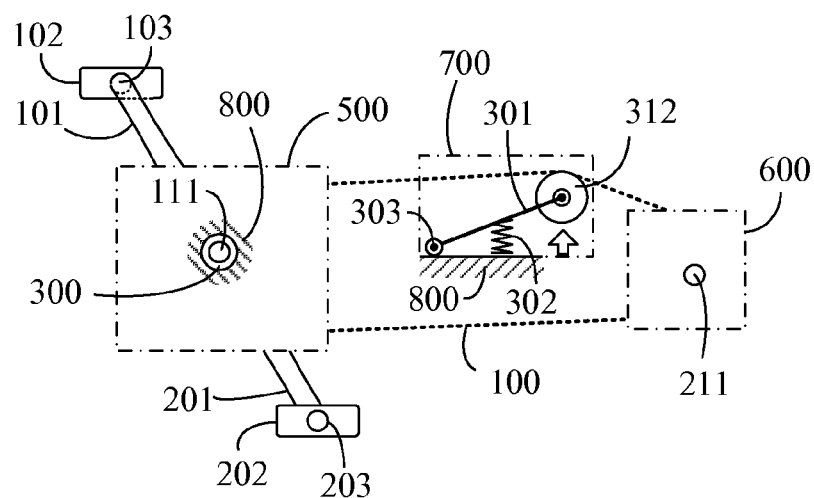
FIG. 9 is the third schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

FIG. 9 is the third schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

As shown in FIG. 9, the main configuration is that the rotation part of the active pulley assembly of the present invention is installed with the unidirectional rotating transmission device (300), the active side of the unidirectional rotating transmission device (300) is combined with the rotation part of the active pulley assembly (500), the passive side of the unidirectional rotating transmission device (300) is combined with the machine body (800), the distal end of the auxiliary wheel press helve (301) swingably installed on the machine body (800) is installed with a first auxiliary pulley (312), the releasing portion of the transmission belt (100) releasing from the passive pulley assembly (600) is installed with the auxiliary wheel press helve (301) capable of swinging along the machine body (800) to expand the prestressing force outwardly from the interior in normal state, the prestressed energy storing/releasing spring (302) and the auxiliary pulley (312).

Figure 10:
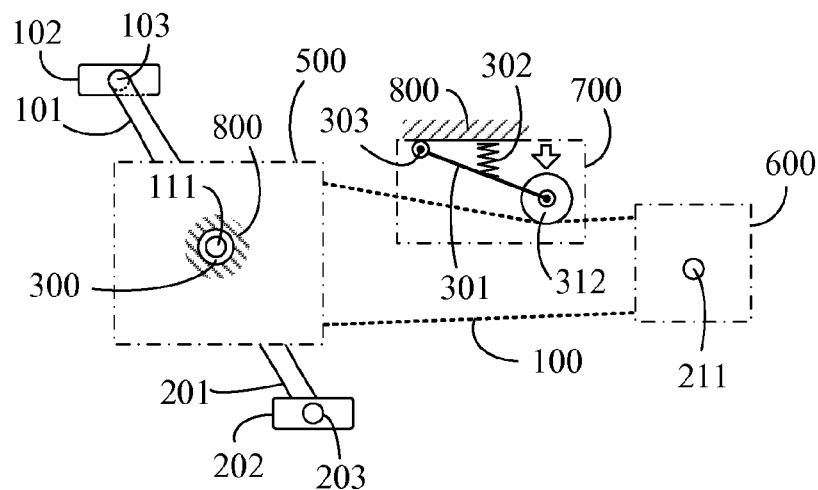
FIG. 10 is the fourth schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

FIG. 10 is the fourth schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

As shown in FIG. 10, the main configuration is that the rotation part of the active pulley assembly of the present invention is installed with the unidirectional rotating transmission device (300), the active side of the unidirectional rotating transmission device (300) is combined with the rotation part of the active pulley assembly (500), the passive side of the unidirectional rotating transmission device (300) is combined with the machine body (800), the distal end of the auxiliary wheel press helve (301) swingably installed on the machine body (800) is installed with a first auxiliary pulley (312), the releasing portion of the transmission belt (100) releasing from the passive pulley assembly (600) is installed with the auxiliary wheel press helve (301) capable of swinging along the machine body (800) to inwardly put prestressing force from the exterior in normal state, the prestressed energy storing/releasing spring (302) and the auxiliary pulley (312).

Figure 11:
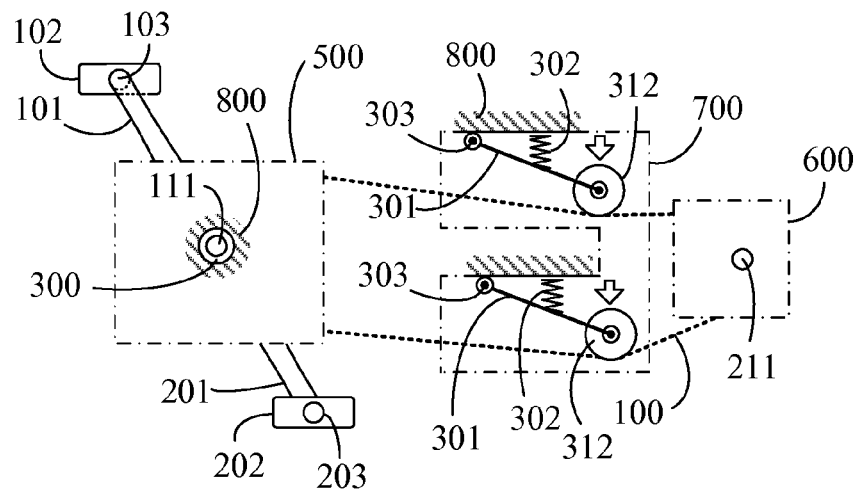
FIG. 11 is the fifth schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

FIG. 11 is the fifth schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

As shown in FIG. 11, the main configuration is that the rotation part of the active pulley assembly of the present invention is installed with the unidirectional rotating transmission device (300), the active side of the unidirectional rotating transmission device (300) is combined with the rotation part of the active pulley assembly (500), the passive side of the unidirectional rotating transmission device (300) is combined with the machine body (800), the distal end of the auxiliary wheel press helve (301) swingably installed on the machine body (800) is installed with a first auxiliary pulley (312), the releasing portion of the transmission belt (100) releasing from the passive pulley assembly (600) is installed with the auxiliary wheel press helve (301) capable of swinging along the machine body (800) to inwardly put prestressing force from the exterior in normal state, the prestressed energy storing/releasing spring (302) and the auxiliary pulley (312), and the engaging portion of the transmission belt (100) being ready to enter the passive pulley assembly (600) is installed with the auxiliary wheel press helve (301) capable of swinging along the machine body (800) to expand the prestressing force outwardly from the interior in normal state, the prestressed energy storing/releasing spring (302) and the auxiliary pulley (312).

Figure 12:
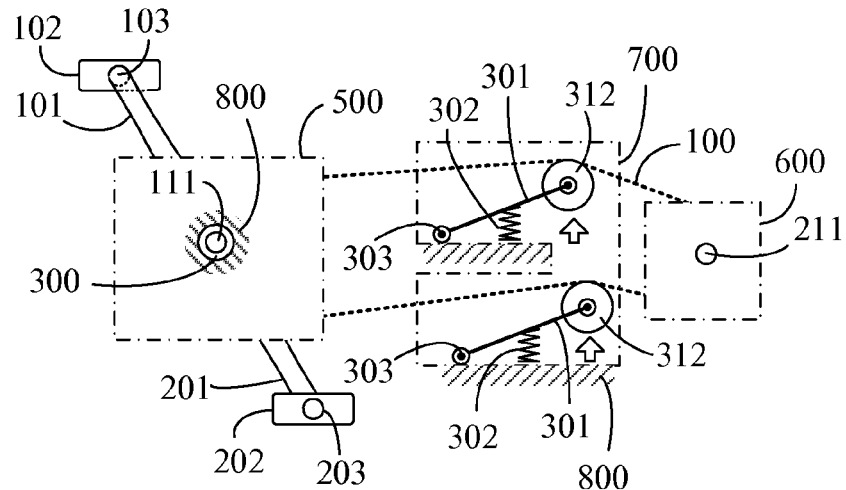
FIG. 12 is the sixth schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

FIG. 12 is the sixth schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

As shown in FIG. 12, the main configuration is that the rotation part of the active pulley assembly of the present invention is installed with the unidirectional rotating transmission device (300), the active side of the unidirectional rotating transmission device (300) is combined with the rotation part of the active pulley assembly (500), the passive side of the unidirectional rotating transmission device (300) is combined with the machine body (800), the distal end of the auxiliary wheel press helve (301) swingably installed on the machine body (800) is installed with a first auxiliary pulley (312), the releasing portion of the transmission belt (100) releasing from the passive pulley assembly (600) is installed with the auxiliary wheel press helve (301) capable of swinging along the machine body (800) to expand the prestressing force outwardly from the interior in normal state, the prestressed energy storing/releasing spring (302) and the auxiliary pulley (312), and the engaging portion of the transmission belt (100) being ready to enter the passive pulley assembly (600) is installed with the auxiliary wheel press helve (301) capable of swinging along the machine body (800) to inwardly put prestressing force from the exterior in normal state, the prestressed energy storing/releasing spring (302) and the auxiliary pulley (312).

Figure 13:
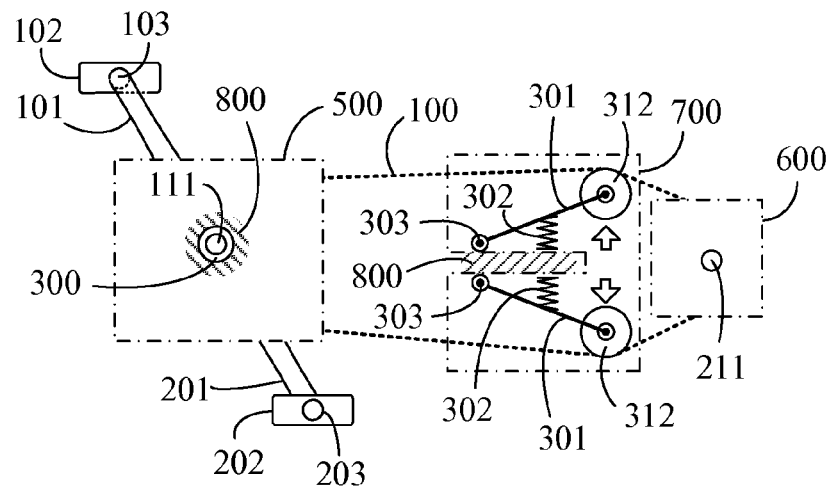
FIG. 13 is the seventh schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

FIG. 13 is the seventh schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

As shown in FIG. 13, the main configuration is that the rotation part of the active pulley assembly of the present invention is installed with the unidirectional rotating transmission device (300), the active side of the unidirectional rotating transmission device (300) is combined with the rotation part of the active pulley assembly (500), the passive side of the unidirectional rotating transmission device (300) is combined with the machine body (800), the distal end of the auxiliary wheel press helve (301) swingably installed on the machine body (800) is installed with a first auxiliary pulley (312), the releasing portion of the transmission belt (100) releasing from the passive pulley assembly (600) is installed with the auxiliary wheel press helve (301) capable of swinging along the machine body (800) to expand the prestressing force outwardly from the interior in normal state, the prestressed energy storing/releasing spring (302) and the auxiliary pulley (312), and the engaging portion of the transmission belt (100) being ready to enter the passive pulley assembly (600) is installed with the auxiliary wheel press helve (301) capable of swinging along the machine body (800) to expand the prestressing force outwardly from the interior in normal state, the prestressed energy storing/releasing spring (302) and the auxiliary pulley (312).

Figure 14:
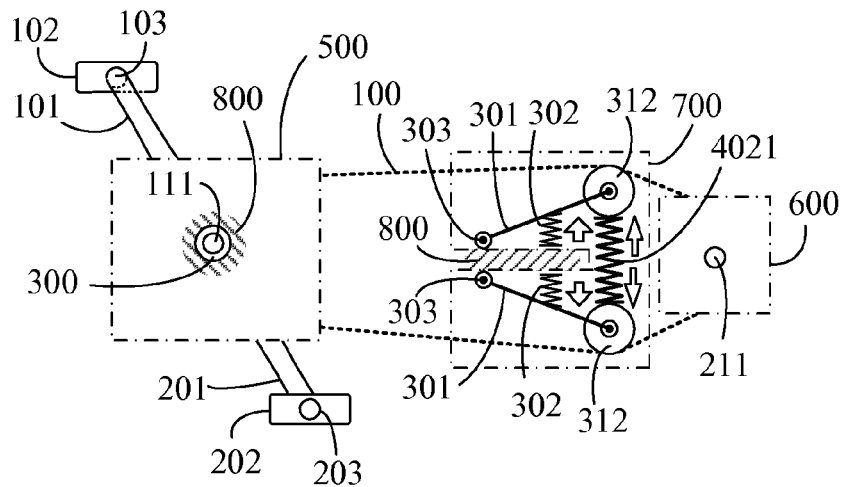
FIG. 14 is the eighth schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

FIG. 14 is the eighth schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

As shown in FIG. 14, the main configuration is that the rotation part of the active pulley assembly of the present invention is installed with the unidirectional rotating transmission device (300), the active side of the unidirectional rotating transmission device (300) is combined with the rotation part of the active pulley assembly (500), the passive side of the unidirectional rotating transmission device (300) is combined with the machine body (800), the distal end of the auxiliary wheel press helve (301) swingably installed on the machine body (800) is installed with a first auxiliary pulley (312), engaged at the releasing portion of the transmission belt (100) releasing from the passive pulley assembly (600), with the function of the prestressed spring for storing/releasing energy (302), the mentioned auxiliary wheel press helve (301) is prestressed and expanded from inward towards outward, and the distal end of the auxiliary wheel press helve (301) swingably installed on the machine body (800) is installed with a second auxiliary pulley (312), engaged at the engaging portion of the transmission belt (100) being ready to be engaged with the passive pulley assembly (600), with the function of the prestressed spring for storing/releasing energy (302), the mentioned auxiliary wheel press helve (301) is prestressed and expanded from inward towards outward, and an bidirectional inward-towards-outward-expanding prestressed spring for storing/releasing energy (4021) is additionally installed between the two auxiliary pulleys (312) and the auxiliary wheel press helve (301).

Figure 15:
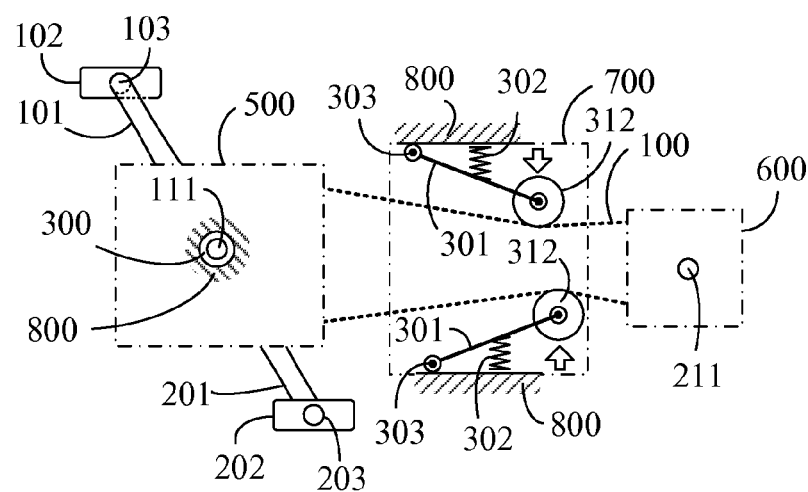
FIG. 15 is the ninth schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

FIG. 15 is a ninth schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

As shown in FIG. 15, the main configuration is that the rotation part of the active pulley assembly of the present invention is installed with the unidirectional rotating transmission device (300), the active side of the unidirectional rotating transmission device (300) is combined with the rotation part of the active pulley assembly (500), the passive side of the unidirectional rotating transmission device (300) is combined with the machine body (800), the distal end of the auxiliary wheel press helve (301) swingably installed on the machine body (800) is installed with a first auxiliary pulley (312), the releasing portion of the transmission belt (100) releasing from the passive pulley assembly (600) is installed with the auxiliary wheel press helve (301) capable of swinging along the machine body (800) to inwardly put prestressing force from the exterior in normal state, the prestressed energy storing/releasing spring (302) and the auxiliary pulley (312), and the engaging portion of the transmission belt (100) being ready to enter the passive pulley assembly (600) is installed with the auxiliary wheel press helve (301) capable of swinging along the machine body (800) to inwardly put prestressing force from the exterior in normal state, the prestressed energy storing/releasing spring (302) and the auxiliary pulley (312).

Figure 16:
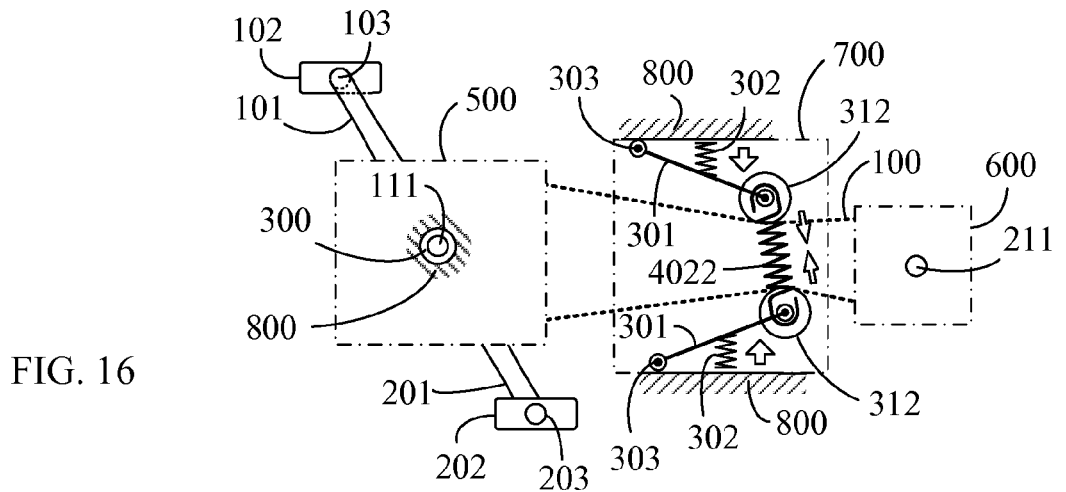
FIG. 16 is the tenth schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

FIG. 16 is a tenth schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

As shown in FIG. 16, the main configuration is that the rotation part of the active pulley assembly of the present invention is installed with the unidirectional rotating transmission device (300), the active side of the unidirectional rotating transmission device (300) is combined with the rotation part of the active pulley assembly (500), the passive side of the unidirectional rotating transmission device (300) is combined with the machine body (800), the distal end of the auxiliary wheel press helve (301) swingably installed on the machine body (800) is installed with a first auxiliary pulley (312), engaged at the releasing portion of the transmission belt (100) releasing from the passive pulley assembly (600), with the function of the prestressed spring for storing/releasing energy (302), the mentioned auxiliary wheel press helve (301) is prestressed and pressed from outward towards inward, and at the distal end of the other auxiliary wheel press helve (301) swingably installed on the machine body (800) is installed with a second auxiliary pulley (312), engaged at the engaging portion of the transmission belt (100) being ready to be engaged with the passive pulley assembly (600), with the function of the prestressed spring for storing/releasing energy (302), the mentioned auxiliary wheel press helve (301) is prestressed and pressed from outward towards inward, and an bidirectional outward-towards-inward-retracting prestressed spring for storing/releasing energy (4022) is additionally installed between the two auxiliary pulleys (312) and the auxiliary wheel press helve (301).

Figure 17:
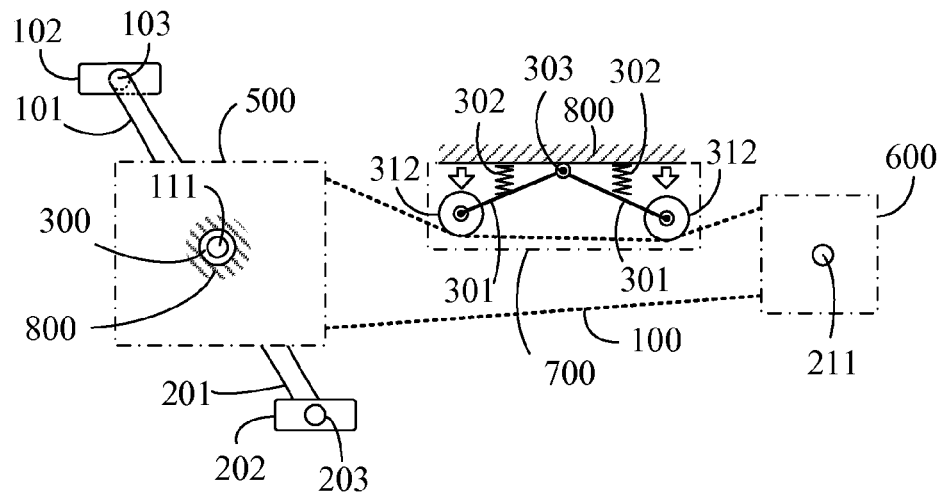
FIG. 17 is the eleventh schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

FIG. 17 is the eleventh schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

As shown in FIG. 17, the main configuration is that the rotation part of the active pulley assembly of the present invention is installed with the unidirectional rotating transmission device (300), the active side of the unidirectional rotating transmission device (300) is combined with the rotation part of the active pulley assembly (500), the passive side of the unidirectional rotating transmission device (300) is combined with the machine body (800), the two auxiliary pulleys (312) are respectively installed at one end of the corresponding auxiliary wheel press helves (301), the other end of the individual auxiliary wheel press helves (301) is swingably combined with the machine body (800) through the swing shaft of auxiliary wheel press helve (303), prestressed springs for storing/releasing energy (302) are respectively installed between the two auxiliary wheel press helves (301) and the machine body (800), the two auxiliary pulleys (312) are engaged at the outer side of the releasing portion of the transmission belt (100) releasing from the passive pulley assembly (600), the two auxiliary pulleys (312) respectively press the transmission belt (100) inward thereby forming a concave bending angle, and with function of prestressed springs for storing/releasing energy (302), the mentioned auxiliary wheel press helves (301) are prestressed and pressed from outward towards inward.

Figure 18:
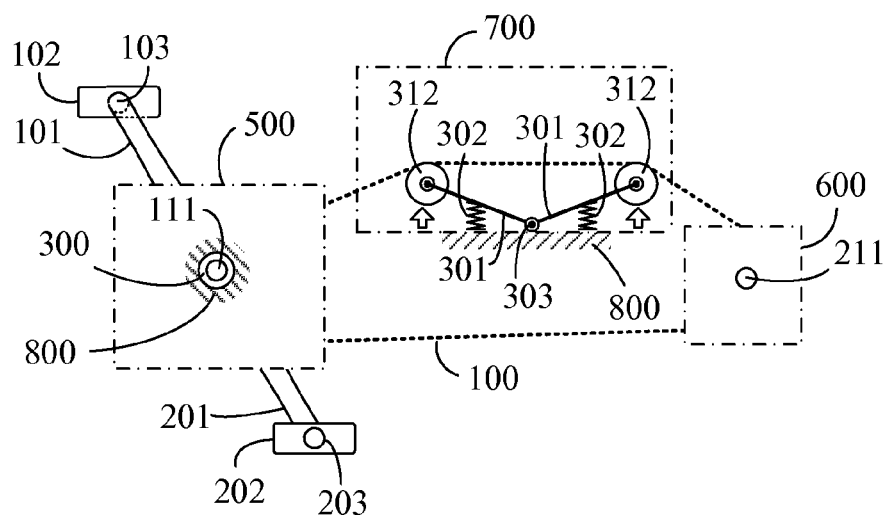
FIG. 18 is the twelfth schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

FIG. 18 is the twelfth schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

As shown in FIG. 18, the main configuration is that the rotation part of the active pulley assembly of the present invention is installed with the unidirectional rotating transmission device (300), the active side of the unidirectional rotating transmission device (300) is combined with the rotation part of the active pulley assembly (500), the passive side of the unidirectional rotating transmission device (300) is combined with the machine body (800), the two auxiliary pulleys (312) are respectively installed at one end of the corresponding auxiliary wheel press helves (301), the other end of the corresponding auxiliary wheel press helves (301) are swingably combined with the machine body (800) through the swing shaft of auxiliary wheel press helve (303), prestressed springs for storing/releasing energy (302) are respectively installed between the two auxiliary wheel press helves (301) and the machine body (800), the two auxiliary pulleys (312) are engaged at the inner side of the releasing portion of the transmission belt (100) releasing from the passive pulley assembly (600), the two auxiliary pulleys (312) respectively expand outward for pressing the transmission belt (100) thereby forming a convex bending angle, and with the function of prestressed springs for storing/releasing energy (302), the mentioned auxiliary wheel press helves (301) are prestressed and expanded from inward towards outward.

Figure 19:
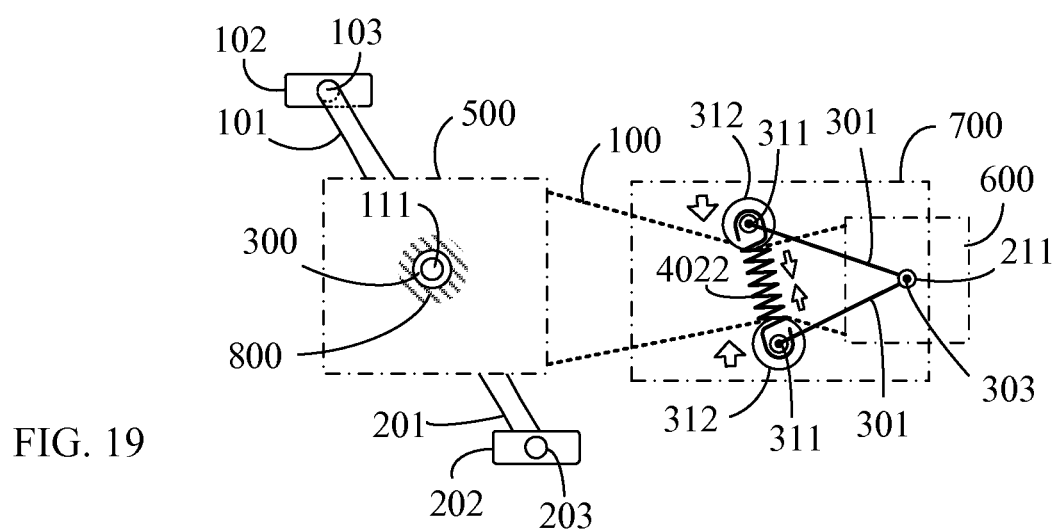
FIG. 19 is the thirteenth schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

FIG. 19 is the thirteenth schematic view illustrating the embodiment of the present invention in which a kinetic energy storing/releasing state being formed between the active pulley assembly (500), the passive pulley assembly (600) and the auxiliary pulley assembly for storing/releasing kinetic energy (700).

As shown in FIG. 19, the main configuration is that the rotation part of the active pulley assembly of the present invention is installed with the unidirectional rotating transmission device (300), the active side of the unidirectional rotating transmission device (300) is combined with the rotation part of the active pulley assembly (500), the passive side of the unidirectional rotating transmission device (300) is combined with the machine body (800), the distal end of the auxiliary wheel press helve (301) swingably installed on the passive wheel shaft (211) is installed with a first auxiliary pulley (312), engaged at the releasing portion of the transmission belt (100) releasing from the passive pulley assembly (600), with the function of the prestressed spring for storing/releasing energy (302), the mentioned auxiliary wheel press helve (301) is prestressed and pressed from outward towards inward, thereby the engaged transmission belt (100) is formed with a concave bending angle; and the distal end of the other auxiliary wheel press helve (301) swingably installed on the passive wheel shaft (211) is installed with a second auxiliary pulley (312), engaged at the engaging portion of the transmission belt (100) being ready to be engaged with the passive pulley assembly (600), with the function of the prestressed spring for storing/releasing energy (302), the mentioned auxiliary wheel press helve (301) is prestressed and pressed from outward towards inward, thereby the engaged transmission belt (100) is formed with a concave bending angle, and an bidirectional outward-towards-inward-retracting prestressed spring for storing/releasing energy (4022) is additionally installed between the two auxiliary pulleys (312) and the auxiliary wheel press helve (301).

The invention claimed is:

1. A transmission wheel series with periodically varied speed ratio comprising:
    an active pulley assembly (500) driven by a power source, said active pulley assembly (500) comprising an active wheel shaft (111), an active pulley (112, 113) and a unidirectional rotating transmission device (300), wherein said active pulley (112, 113) is combined with said active wheel shaft (111), said active wheel shaft (111) being configured to input rotational kinetic energy to a machine, said unidirectional rotating transmission device (300) being installed between the active wheel shaft (111) and a machine body (800), wherein said active pulley (112, 113) comprises at least one pulley formed in one of a circular, or bimodal elliptical, or eccentric circular, or eccentric elliptical or eccentric bimodal elliptical shape;
    a passive pulley assembly (600) comprising a passive wheel shaft (211) and a passive pulley (212, 213, 413), said passive pulley (212, 213, 413) being configured to rotate on the passive wheel shaft (211), wherein said passive pulley (212, 213, 413) comprises at least one pulley formed in one of a circular, or bimodal elliptical, or eccentric circular, or eccentric elliptical or eccentric bimodal elliptical shape;

a transmission belt (100) comprising a chain or a tooth-shaped transmission belt for linking the active pulley assembly (500) and the passive pulley assembly (600) to cause the passive pulley (212, 213, and 413) to rotate in response to rotation of the active pulley (112, 113), wherein as a result of different shapes or eccentricities of the active pulley (112,113) and the passive pulley (212, 213, 214), a speed ratio between the active pulley (112, 113) and the passive pulley (212, 213, 413) varies periodically during rotation of the active pulley (112, 113), and wherein the wheel set comprises at least one of (a) a chain-shaped transmission belt and a chain wheel and (b) a tooth-shaped pulley and a tooth-shaped transmission belt; and an auxiliary pulley assembly (700) configured to store and release kinetic energy comprising at least one auxiliary pulley (312) and at least one auxiliary wheel press helve (301), said auxiliary pulley (312) being configured to apply a prestress force to a portion of the transmission belt (100) between the passive pulley (212, 213, 413) and the active pulley (112, 113) so that as a speed ratio between the active pulley (112, 113) and the passive pulley (212, 213, 413) varies periodically during rotation of the active pulley (112, 113), a tightness of the transmission belt is varied correspondingly wherein:

when the transmission belt (100) is gradually tightened during a rotation of the active pulley (112, 113), the auxiliary wheel press helve (301) is displaced for storing energy by having the transmission belt bear against the auxiliary pulley, and when the transmission belt (100) is gradually loosened during the driving of the passive pulley (212, 213, 413) by the active pulley (112, 113), the auxiliary wheel press helve (301) is configured to have an energy releasing displacement to bear the auxiliary pulley (312) against the transmission belt, so that the auxiliary pulley assembly (700) is configured to perform an energy releasing drive by bearing against the transmission belt to (100) to maintain the linking between the passive pulley (212, 213, 413) and the active pulley (112, 113) in the original rotating direction.

2. A transmission wheel series with periodically varied speed ratio as claimed in claim 1, wherein a first side of said active wheel shaft (111) of said active pulley (112, 113) is rotatably driven by a first treadle (102) rotatably mounted on first treadle shaft (103) extending from a first crank (101) extending from the first side of the active wheel shaft (111) and a second side of said active wheel shaft (111) is driven by a second treadle (202) rotatably mounted on second treadle shaft (203) extending from a second crank (201) extending from a second side of the active wheel shaft (111), such that when the first treadle (102) and the second treadle (202) are alternatingly stepped-on to apply force to the treadles and cause rotation of the active wheel shaft (111) and the active pulley (112, 113), the speed ratio between the active pulley (112, 113) and the passive pulley (212, 213, 413) varies during each alternating period of the stepping.

3. A transmission wheel series with periodically varied speed ratio as claimed in claim 2, wherein the active pulley is a bimodal elliptical active pulley (112).

4. A transmission wheel series with periodically varied speed ratio as claimed in claim 3, wherein the passive pulley is a circular passive pulley (212) linked to the bimodal elliptical active pulley (112) by the transmission belt (100).

5. A transmission wheel series with periodically varied speed ratio as claimed in claim 3, wherein the passive pulley is bimodal elliptical passive pulley (213) linked to the bimodal elliptical active pulley (112) by the transmission belt (100).

6. A transmission wheel series with periodically varied speed ratio as claimed in claim 3, wherein the passive pulley is an eccentric circular passive pulley (413) linked to the bimodal elliptical active pulley (112) by the transmission belt (100).

7. A transmission wheel series with periodically varied speed ratio as claimed in claim 2, wherein the active pulley is a circular active pulley (113).

8. A transmission wheel series with periodically varied speed ratio as claimed in claim 7, wherein the passive pulley is bimodal elliptical passive pulley (213) linked to the bimodal elliptical active pulley (112) by the transmission belt (100).

9. A transmission wheel series with periodically varied speed ratio as claimed in claim 7, wherein the passive pulley is an eccentric circular passive pulley (413) linked to the bimodal elliptical active pulley (112) by the transmission belt (100).

10. A transmission wheel series with periodically varied speed ratio as claimed in claim 7, wherein:

said auxiliary wheel press helve (301) is formed as a rigid and swingable support arm structure having one end swingably coupled with the machine and the other end thereof installed with an auxiliary wheel shaft (311) for being installed with the auxiliary pulley (312), and includes an energy storing/releasing spring (302) installed between the auxiliary wheel press helve and the machine body (800); or said auxiliary wheel press helve (301) has a plate-shaped spring function, said auxiliary wheel press helve (301) having one end combined with the machine body (800) and the other end installed with the auxiliary wheel shaft (311) and the auxiliary pulley (312), so that the auxiliary pulley is enabled to receive the prestress applied by the auxiliary wheel press helve (301).

11. A transmission wheel series with periodically varied speed ratio as claimed in claim 10, wherein said prestress force is an outward-to-inward prestress force applied to an outside surface of the transmission belt (100) to cause said transmission belt (100) to assume a concave bend.

12. A transmission wheel series with periodically varied speed ratio as claimed in claim 11, further comprising a second auxiliary pulley (312) and a second auxiliary wheel press helve (301), said second auxiliary pulley (312) being configured to apply a second prestress force to a portion of the transmission belt (100) between the passive pulley (212, 213, 413) and the active pulley (112, 113), wherein said second prestress force is aninward-to-outward prestress force applied to an inside surface of the transmission belt (100).

13. A transmission wheel series with periodically varied speed ratio as claimed in claim 11, further comprising a second auxiliary pulley (312) and a second auxiliary wheel press helve (301), said second auxiliary pulley (312) being configured to apply a second prestress force to a portion of the transmission belt (100) between the passive pulley (212, 213, 413) and the active pulley (112, 113), wherein said second prestress force is an outward-to-inward prestress force applied to an outside surface of the transmission belt (100).

14. A transmission wheel series with periodically varied speed ratio as claimed in claim 13, wherein said first and second auxiliary pulleys (312) and said first and second auxiliary wheel press helves (301) are positioned on opposite sides of said transmission wheel series.

15. A transmission wheel series with periodically varied speed ratio as claimed in claim 13, wherein said first and second auxiliary pulleys (312) and said first and second auxiliary wheel press helves (301) are positioned on a same side of said transmission wheel system, said first and second auxiliary wheel press helves (301) being swingably mounted on a common shaft (303).

16. A transmission wheel series with periodically varied speed ratio as claimed in claim 10, wherein said prestress force is an inward-to-outward prestress force applied to an inside surface of the transmission belt (100) to cause said transmission belt (100) to assume a convex bend.

17. A transmission wheel series with periodically varied speed ratio as claimed in claim 16, further comprising a second auxiliary pulley (312) and a second auxiliary wheel press helve (301), said second auxiliary pulley (312) being configured to apply a second prestress force to a portion of the transmission belt (100) between the passive pulley (212, 213, 413) and the active pulley (112, 113), wherein said second prestress force is an inward-to-outward prestress force applied to an inside surface of the transmission belt (100).

18. A transmission wheel series with periodically varied speed ratio as claimed in claim 17, wherein said first and second auxiliary pulleys (312) and said first and second auxiliary wheel press helves (301) are swingably mounted to opposite sides of a section of the machine body (800) situated within said transmission wheel series.

19. A transmission wheel series with periodically varied speed ratio as claimed in claim 17, wherein said first and second auxiliary pulleys (312) and said first and second auxiliary wheel press helves (301) are positioned on a same side of a section of said machine body (800), said first and second auxiliary wheel press helves (301) being swingably mounted on a common shaft (303).

20. A transmission wheel series with periodically varied speed ratio as claimed in claim 1, further comprising:
a second auxiliary pulley (312) and a second auxiliary wheel press helve (301), said second auxiliary pulley (312) being configured to apply a second prestress force to a portion of the transmission belt (100) between the passive pulley (212, 213, 413) and the active pulley (112, 113), wherein said first and second prestress forces are inward-to-outward prestress forces applied to an inside surface of the transmission belt (100), an inward-to-outward expanding prestressed spring (4021) for storing/releasing energy, said inward-to-outward expanding prestressed spring (4021) having ends respectively coupled to the first and second auxiliary pulleys (312) or first and second auxiliary wheel press helves (301) for pushing said first and second auxiliary pulleys (312) or said first and second auxiliary wheel press helves (301) away from each other in order to apply said inward-to-outward prestress forces to said inside surface of the transmission belt (100).

21. A transmission wheel series with periodically varied speed ratio as claimed in claim 1, further comprising:
a second auxiliary pulley (312) and a second auxiliary wheel press helve (301), said second auxiliary pulley (312) being configured to apply a second prestress force to a portion of the transmission belt (100) between the passive pulley (212, 213, 413) and the active pulley (112, 113), wherein said first and second prestress forces are outward-to-inward prestress forces applied to said outside surface of the transmission belt (100), an outward-to-inward compressing prestressed spring (4022) for storing/releasing energy, said outward-to-inward compressing spring (4022) having ends respectively coupled to the first and second auxiliary pulleys (312) or first and second auxiliary wheel press helves (301) for pulling said first and second auxiliary pulleys (312) or said first and second auxiliary wheel press helves (301) towards each other in order to apply said outward-to-inward prestress forces to said outside surface of the transmission belt (100).

22. A transmission wheel series with periodically varied speed ratio as claimed in claim 21, wherein said first and second auxiliary wheel press helves (301) are swingably mounted to a shaft (303) extending from said passive wheel shaft (211).

\* \* \* \* \*